United States Patent [19]

Nussbaum

[11] 4,349,592
[45] Sep. 14, 1982

[54] THERMOPLASTIC ELASTOMER MOLDING

[75] Inventor: Joel H. Nussbaum, Farmington Hills, Mich.

[73] Assignee: The Standard Products Company, Cleveland, Ohio

[21] Appl. No.: 169,772

[22] Filed: Jul. 17, 1980

[51] Int. Cl.³ ............ B32B 31/30; B60R 13/04
[52] U.S. Cl. .................... 428/31; 52/716; 293/1; 428/122; 428/358
[58] Field of Search ............ 428/31, 122, 358; 52/716; 293/1

[56] References Cited

U.S. PATENT DOCUMENTS

| | | | |
|---|---|---|---|
| 1,910,331 | 5/1933 | Halbig | 568/851 |
| 3,355,319 | 11/1967 | Rees | 428/497 X |
| 3,543,465 | 12/1970 | Jackson | 428/31 X |
| 3,616,099 | 10/1971 | Shanok et al. | 428/31 X |
| 3,982,780 | 9/1976 | Keith | 428/31 X |
| 4,010,297 | 3/1977 | Wenrick | 428/41 X |
| 4,037,013 | 7/1977 | Sprague | 428/310 |
| 4,148,972 | 4/1979 | Yamane et al. | 428/515 |
| 4,277,526 | 7/1981 | Jackson | 428/31 |
| 4,298,640 | 11/1981 | Katoh | 428/31 |

Primary Examiner—Henry F. Epstein
Attorney, Agent, or Firm—Harness, Dickey & Pierce

[57] ABSTRACT

Disclosed is a lightweight laminate and a method for making the laminate. Protective and decorative molding and trim strips for automotive vehicles and the like can be made from the laminate which has a body comprising an extruded thermoplastic elastomer material and an extruded outer layer with a tie sheet sandwiched therebetween. The tie sheet is made with sheet lamination technique and is a laminate of a layer compatible with thermoplastic elastomer material and a layer compatible with the outer layer. Optionally, the outer layer can be transparent and a decorative layer of metallized polyester and/or other material can be encapsulated between the outer layer and the tie sheet.

8 Claims, 6 Drawing Figures

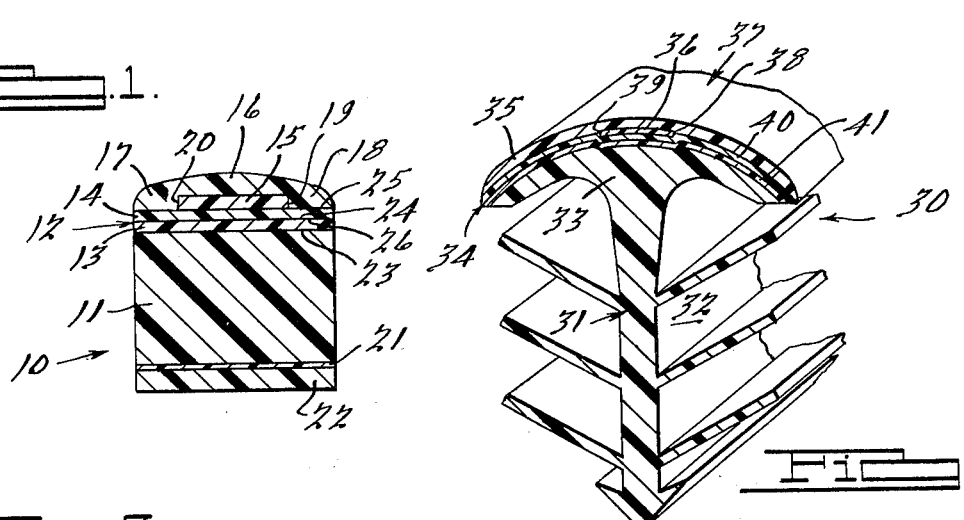
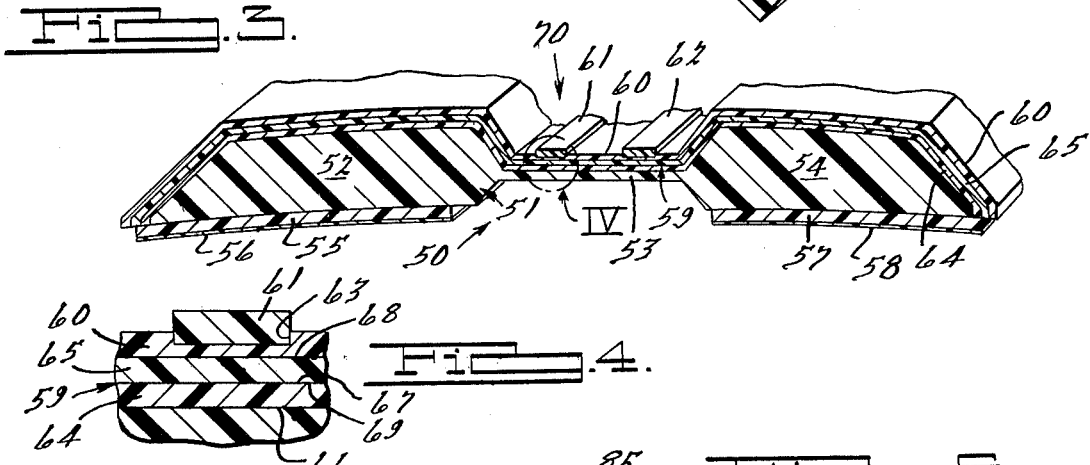
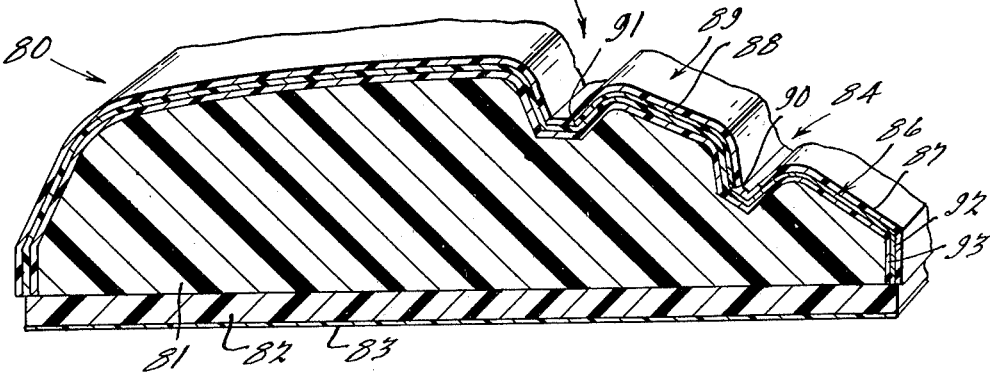
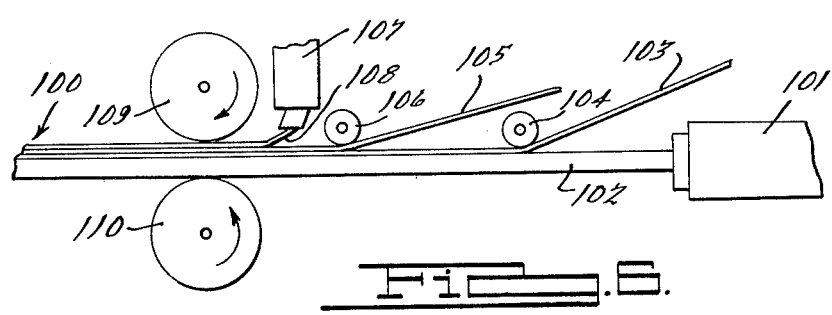

THERMOPLASTIC ELASTOMER MOLDING

BACKGROUND AND SUMMARY OF THE INVENTION

This invention relates to laminated products or constructions and their method of making, and, in particular, relates to trim strips or moldings made therefrom which are adapted for attachment to automobiles or other vehicles for decorative and protective purposes. Trim strips or moldings made in accordance with this invention have an attractive appearance and function satisfactorily yet are light in weight and, hence, can be employed instead of heavier trim strips or moldings to reduce the weight of vehicle to which they are attached. Reduced weight, of course, increases the fuel efficiency of a vehicle and promotes energy conservation. As used hereinafter, the term "molding" will be used with the understanding that it broadly includes molding strips, trim strips and the like.

Automotive moldings are well known and have been used for many years to improve the appearance and protect the bodies of automotive vehicles. In recent years there has been increasing use of plastic materials in the manufacture of moldings. While such moldings offer satisfactory performance and appearance characteristics, there is a continuing need to reduce the weight of vehicles for increased fuel efficiency. Accordingly, it would be desirable to develop moldings which are light in weight and yet have satisfactory performance characteristics for long term use and protection of the vehicle while also presenting an attractive appearance.

One class of materials which is relatively lightweight and which can be extruded into suitable shapes for moldings is the class of thermoplastic elastomers. Such materials can be, for example, about 25% lighter in weight than the polyvinyl chloride which is now commonly used in moldings. Furthermore, thermoplastic elastomer materials can have excellent physical properties for use in moldings such as good processability, low shrinkage, good high and low temperature properties, and good weathering. Unfortunately, the mar resistance of thermoplastic elastomer materials is generally poor and pigmenting such materials to obtain a variety of colors can be difficult.

It would be desirable to have a molding largely comprising lightweight thermoplastic elastomer material but which has excellent mar resistance and could be easily pigmented. In addition, it would be desirable if such molding could optionally incorporate a metallic appearing decorative strip. A molding having a thermoplastic elastomer body with a layer of extruded polyvinyl chloride or ionomer resin laminated thereon has advantages of the thermoplastic elastomer material yet also has good mar resistance and a surface layer which can be easily pigmented. However, it has been found to be difficult to laminate such dissimilar layers using the usual extrusion techniques.

In accordance with the present invention, a laminate construction of an extruded thermoplastic elastomer body and a layer of dissimilar extruded plastic is provided by interposing a tie sheet therebetween, said tie sheet comprising a laminate of a first layer comprising a material compatible with the thermoplastic elastomer body and a second layer comprising a material compatible with the layer of dissimilar extruded plastic. By the term "compatible" it is meant that the one material will bond to the other material using conventional extrusion lamination techniques involving heat.

BRIEF DESCRIPTION OF THE DRAWINGS

FIG. 1 is a transverse sectional view of a laminate made in accordance with the present invention;

FIG. 2 is a perspective view, broken away and in section, of an alternative molding made in accordance with the present invention;

FIG. 3 is a perspective view, broken away and in section, of still another alternative molding made in accordance with the present invention;

FIG. 4 is an enlarged view of the portion of FIG. 3 indicated by the numeral IV;

FIG. 5 is a perspective view, broken away and in section, of yet another alternative embodiment of the present invention; and FIG. 6 is a somewhat diagrammatical view of a method of making a laminate construction in accordance with the present invention.

DESCRIPTION OF THE INVENTION

In accordance with the present invention, it has been found that a laminate of extruded thermoplastic elastomer material, hereinafter referred to as TPE, and a dissimilar extruded thermoplastic, such as a polyvinyl chloride or an ionomer resin, can be provided by interposing therebetween a laminate of a material compatible with thermoplastic elastomer material and a thermoplastic material which is compatible with the aforementioned layer of dissimilar extruded thermoplastic. For example, in a molding product, a laminate of a lightweight extruded thermoplastic olefin body, a tie sheet bilaminate of a polyolefin sheet and a polyvinyl chloride sheet and an outer layer of polyvinyl chloride can be provided to provide a molding having good mar resistance and an outer layer which can be easily pigmented. In addition, the molding can carry and present for visual view a bright, metallic strip or other decorative strip.

Thus, in accordance with the method of the present invention, TPE is extruded to form a TPE body which is laminated, using conventional extrusion laminating techniques involving heat, to a tie sheet. The tie sheet is a laminate comprising a first layer comprising a material which will adhere well to the TPE body when heated thereagainst and a second layer of a dissimilar thermoplastic material which will adhere well to an outer layer of material when heated thereagainst. The layers of the tie sheet are laminated together using conventional sheet lamination techniques including pressure rollers and an adhesive. The tie sheet is laminated to the TPE body and to the outer layer of material using conventional extrusion lamination techniques involving heat.

TPE materials are known materials and are taught, for example, in *Handbook of Thermoplastic Elastomers,* ed. by Benjamin M. Walker, Van Nostrand Reinhold Company, 1979. TPE materials preferred for use herein are polyolefin thermoplastic elastomers such as mechanical blends of an ethylene-propylene or ethylene-propylene-diene rubber and a thermoplastic such as polypropylene. Commercially available thermoplastic olefin materials include those marketed as Uniroyal's TPR ® from Uniroyal Inc., B. F. Goodrich's Telcar ® from B. F. Goodrich Co., and TPO Ren-Flex, from Ren Plastics. Other TPE materials include block polymers, polyester thermoplastic elastomers, thermoplastic polyurethane elastomers, and so forth. It will be appreciated that the term TPE refers to a material which has characteristics of both a thermoplastic material and an elastomer material. Thus, a TPE material softens when exposed to heat, returns to its original condition when cooled to room temperature, and at room temperature can be substantially stretched and will return to its approximate original length. Although TPE materials are relatively lightweight, they can be made even lighter in weight by employing conventional blowing techniques without departing from the present invention.

The tie sheet of the present invention is a laminate of a first layer compatible with the TPE body, and a second layer, compatible with the outer layer which is a material dissimilar to TPE material and difficult to laminate thereto using conventional extrusion lamination techniques. It will, of course, be appreciated that the layers of the tie sheet would be difficult to laminate using extrusion techniques but are laminated together using conventional sheet lamination techniques which are more effective under production conditions. Thus, the respective first and second layers can be joined together by a conventional adhesive such as a 2-part urethane adhesive, for example, "Adcote" 122 from Morton Chemical Co. The respective layers can be passed between calender rolls to urge them together and to remove dead air from between layers. Preferably, the tie sheet layers have thicknesses of from about 1.5 to about 10 mils for the first layer and from about 3 to about 30 mils for the second layer. Generally speaking the tie sheet is a bilaminate, however, more than two layers may be employed in the tie sheet so long as the aforementioned first and second layers of the tie sheet are positioned against the TPE body and dissimilar outer layer, respectively. Of course, it will also be understood that the outer layer can have one or more additional layers thereon without departing from the concept of the present invention. The term "outer layer" refers to the layer which is relatively outer with respect to the sandwich of the TPE body, tie sheet, and outer layer.

A tie sheet of the present invention for use with a thermoplastic olefin body and a polyvinyl chloride outer layer can suitably have a first layer comprising a polyolefin material such as polyethylene or polypropylene. The second layer can suitably comprise polyvinyl chloride or other material which will adhere to polyvinyl chloride when heated thereagainst. Alternatively, if the outer layer is an ionomer resin, the second layer of the tie sheet can, for example, comprise an ionomer resin.

It has been found that a decorative film such as metallized polyester film can be encapsulated between a portion of the outer layer and tie sheet to provide a bright metallic appearance to a portion of the laminate. In addition, a grain pattern or embossment can be provided on the outer layer. Although TPE generally does not readily accept such grain, the outer layer can comprise a material such as polyvinyl chloride, which will accept such grain. It will be understood that a clear or transparent outer layer should be employed so that the decorative film can be seen therethrough. Of course, if no decorative film is used, the outer layer can be pigmented to obtain the desired color. It will be appreciated by those skilled in the art that the present invention allows use of polyvinyl chloride or other easily pigmented materials in the outer layer.

Now referring to the figures, FIGS. 1-5 show preferred embodiments of laminate constructions of the present invention including molding or trim strips for automotive vehicles. FIG. 1 illustrates a laminate of the present invention which is indicated generally by the numeral 10. Laminate 10 is an elongated laminate shown in transverse cross-section to illustrate the laminated layers thereof. Laminate 10 has a relative thick extruded body 11 which has a tie sheet 12 laminated thereto. Body 11 is made of TPE material such as a thermoplastic olefin while tie sheet 12 comprises a bilaminate of a first layer 13 comprising a material compatible with TPE, such as polyolefin, and which is adhesively laminated to a second layer 14 comprising a material compatible with outer layer 16. In manufacture of laminate 10, tie sheet 12 is made using conventional sheet laminating techniques while laminations of tie sheet 12 to body 11 and tie sheet 12 to outer layer 16 are made using conventional extrusion techniques involving heat. Thus, first layer 13 can be laminated to body 11 with heat. A bright strip 15 of decorative polyester film such as top coated Mylar ® is interposed between tie sheet 12 and outer layer 16 which can comprise clear polyvinyl chloride. If outer layer 16 comprises polyvinyl chloride, then second layer 14 of tie sheet 12 can suitably also comprise polyvinyl chloride. Bright strip 15 is completely encapsulated and retained within molding 10 by the construction of the present invention since side edge portions 17 and 18 of layer 16 completely cover the side edges 19 and 20 of bright strip 15. It should, of course, be understood that clear layer 16 is laminated along side portions 17 and 18 to layer 14 of tie strip 12 by conventional extrusion techniques involving heat.

Means for attaching molding 10 to a surface of an automobile or the like is provided by pressure sensitive tape 22 which is adhesively secured to body 11 by a layer of adhesive 21. Suitable pretreatment systems to promote adhesion of tape to the molding are well known in the art and include, for example, the Seibert-Oxidermo system.

Thus, in accordance with the present invention, laminate 10 has a body portion 11 comprised of a thermoplastic olefin material and to which is laminated a tie strip 12 which is a bilaminate of a first layer of polyolefin material and a second layer of polyvinyl chloride material. Surface 23 of tie strip 12 is laminated to body 11 using conventional extrusion technology involving heat. Surface 26 of first layer 13 is laminated to surface 24 of second layer 14 of tie sheet 13 by means of a conventional adhesive, such as a 2-part urethane adhesive and by a conventional sheet laminating technique. Surface 25 of second layer 14 presents a surface to which the outer layer 16 can be laminated using a conventional extrusion technique. A decorative layer 15 can be encapsulated between outer layer 16 and the sheet 12. Outer layer 16 comprises polyvinyl chloride which can be easily pigmented, if desired, or can be transparent to allow view of decorative layer 15. Thus, laminate 10 obtains the advantages of polyvinyl chloride material with regard to mar resistance. Also, laminate 10 obtains the advantages of lightweight construction, with excellent physical properties such as low shrinkage, good high and low temperature properties and good weathering, while at the same time having good mar resistance and appearance.

Now referring to FIG. 2, a molding made in accordance with the present invention is shown and indicated generally by the numeral 30. Molding 30 is a molding suitable for use, for example, around the windshield of an automotive vehicle. Molding 30 comprises a body 31 which has a portion 32 adapted to be retained in a channel about a windshield in a conventional manner and a head portion 33 adapted to extend outwardly from the retaining channel. Body 31 is made of TPE material, such as Ren-flex 1016 plastic supplied by Ciba-Geigy. Laminated to the outwardly facing surface of head portion 33 is tie sheet 34 while outer layer 35 is laminated to tie sheet 34. Outer layer 35 comprises an ultraviolet stabilized ionomer resin, a Surlyn blend, such as PS20N supplied by Adell. Disposed between a portion of tie sheet 34 and outer layer 35 is a bright strip 36 of metallized polyester film. In a manner similar to the molding 10 of FIG. 1, the bright strip 36 presents a bright surface indicated generally by the numeral 38 and enhances the appearance of molding 30. Side edges 38 and 39 of bright strip 36 are encapsulated within layers 35 and tie strip 34 to prevent deterioration thereof by exposure of light strip 36 to the elements.

Tie sheet 34 comprises a first layer 41 and a second layer 40 which are adhesively laminated to each other by a conventional sheet laminating technique prior to lamination of tie sheet 34 to body 31. First layer 41 of tie sheet 34 comprises a material compatible with the TPE material of body 31 such as a polyolefin material such as polypropylene, and hence, can be laminated to body 31 of molding 30 using conventional extrusion techniques involving heat. Second layer 40 of tie sheet 34 comprises a Surlyn ® material and hence, facilitates lamination of outer layer 35 thereon by conventional extrusion techniques. Thus, molding 30 obtains the advantages set forth hereinabove with respect to being lightweight and having good mar resistance, appearance and weather resistance.

Now referring to FIGS. 3 and 4, still another alternative embodiment of the present invention is shown and indicated generally by the numeral 50. Molding 50 is of a design suitable, for example, for use as a body side molding for an automotive vehicle. Molding 50 comprises a body 51 which is somewhat dumbbell shaped in cross-section, having enlarged side portions 52 and 54 joined by a relatively thin intermediate portion 53. Body 51 comprises a TPE material, a thermoplastic olefin material. Means for attaching respective side portions 52 and 54 of molding 50 to the surface of a vehicle or the like is provided by pressure sensitive type strips 55 and 57 with respective release liners 56 and 58. Tie strip 59 is laminated to body 51 and outer layer 60 is laminated to tie strip 59. Outer layer 60 is comprised of a polyvinyl chloride material.

As is shown in FIG. 4, vinyl strip 61 is secured partially within slot 63 cut into an outer layer 60 by conventional extrusion techniques using heat. Vinyl 62 is secured in an analogous manner.

Tie sheet 59 has first layer 64 comprising a polyolefin material, such as polyethylene or polypropylene, and a second layer 65 comprising a polyvinyl chloride material. Surfaces 67 and 69 of tie sheet 59 are adhesively secured to each other prior to use of the sheet 59 by a conventional sheet laminating technique. Thus, tie sheet 59 has surface 66 which can be readily laminated to body 51 and a surface 68 which can be readily laminated to outer layer 60 with conventional extrusion techniques using heat.

Thus, molding 50 obtains the advantages hereinbefore set forth with regard to the present invention. Molding 50 also emphasizes the advantages of the present invention with regard to providing an elongated molding structure having a notch 70 extending along the length thereof and hence, having a structure most easily formed by extrusion techniques, i.e., a complex cross-section.

Now referring to FIG. 5, still another alternative embodiment of the present invention is shown and indicated generally by the numeral 80. Molding 80 comprises a body 81 made of TPE material, thermoplastic olefin material, and has pressure sensitive tape 82 with release liner 83 secured to one surface thereof to provide means for attaching molding 80 to a structural surface, such as the side of an automotive vehicle body. Body 81 has a pair of notches 84 and 85 extending axially therealong to enhance the appearance thereof, thus providing a structure best suited for an extrusion process. Laminated to body 81 is tie sheet 86. Laminated to tie sheet 86 is outer layer 87 which comprises a clear polyvinyl chloride material. A decorative polyester film strip 88 is sandwiched between a portion of outer layer 87 and tie sheet 86 and is encapsulated thereby. Thus, molding 80 is adapted to present a bright metallic portion along the portion generally indicated by the numeral 89. Side edges 90 and 91 of decorative film 88 are covered by outer layer 87 and hence, decorative film 88 is sealed and protected from the weather elements.

Tie sheet 86 has a first layer 93 comprising a polyolefin material and a second layer 92 comprising a polyvinyl chloride material or other compatible thermoplastic material. Layers 93 and 92 are laminated to each other by means of an adhesive and conventional sheet laminating technique prior to incorporation of tie sheet 86 in molding 80.

Thus, tie sheet 86 allows use of a body 81 comprised of TPE material and the advantages attendant thereto while facilitating lamination of an outer layer 87 of polyvinyl chloride using extrusion techniques to obtain the advantages with regard to mar resistance and appearance attendant to use of the latter material. Thus, obtained is a lightweight and functional molding having an excellent appearance including bright work.

Now referring to FIG. 6, a process for making a laminate construction of the present invention is illustrated somewhat diagrammatically. Thus, a lamination 100 of this invention is provided by extruding the TPE body sheet or profile 102 with extruder 101. After extrusion of body 102, tie sheet 103 is passed between body 102 and roller 104 and is laminated by heat to body 102. Tie sheet 102 can be a previously laminated tie sheet or the layers thereof can be laminated together as the tie sheet is applied to body 102. Optionally, a decorative strip 105 is then layered on tie sheet 103 under roller 106. Then an outer layer 108 is extruded by extruder 107 on top of strip 105 and tie sheet 103 whereupon the entire laminate construction is passed between calender rollers 109 and 110 which apply pressure thereto. It will be appreciated that the materials and adjacent layers thereof are in accordance with the foregoing disclosure which will not be repeated here.

While the present invention has been disclosed largely in terms of laminate constructions adapted for use as moldings or trim strips for automotive vehicles, it will be appreciated by those skilled in the art that the invention herein is subject to modification and variation and is broadly adaptable for other products. Thus, in accordance with the present invention, a sheet of TPE material is provided which can carry bright work and which can be vacuum or thermoformed to specific shapes for uses other than automotive moldings. Thus, housings or covers can be die cut and thermoformed out of the sheet material provided in accordance with the present invention without loss of advantages thereof. Furthermore, the laminated products of the present invention can comprise a thermoplastic elastomer body with good resistance to chemicals, wear, weathering, and so forth.

It is intended that the present invention be limited only by the spirit and scope of the claims appended hereto.

What is claimed is:

1. A laminate construction having an extruded body comprising thermoplastic elastomer material; an extruded outer layer of dissimilar material; and a tie sheet sandwiched between and laminated to each of said body and said outer layer; said tie sheet comprising an adhesively secured laminate of a first layer and a second layer, said first layer being heat laminated to said body and comprising a material compatible therewith, and said second layer being heat laminated to said outer layer and comprising a material compatible therewith.

2. A laminate as in claim 1 wherein said thermoplastic elastomer material is a thermoplastic olefin and wherein said first layer comprises a polyolefin material.

3. A laminate as in claim 2 wherein said second layer and said outer layer each comprise polyvinyl chloride.

4. A laminate as in claim 2 wherein said second layer and said outer layer each comprise an ionomer resin.

5. A laminate as in claim 1 wherein a decorative strip is sandwiched between said second layer and said outer layer.

6. A laminate as in claim 1 wherein said laminate is a molding adapted for use with an automotive vehicle.

7. A laminate as in claim 6 wherein said molding is adapted to be secured to the side of an automotive vehicle.

8. A laminate as in claim 6 wherein said body has a portion adapted to be retained in a channel about an automotive windshield.

* * * * *